US012601284B2

(12) United States Patent
Ait Bengrir et al.

(10) Patent No.: US 12,601,284 B2
(45) Date of Patent: Apr. 14, 2026

(54) INSTALLATION FOR PRODUCING ELECTRICITY OR MECHANICAL POWER, COMPRISING A COMBINED CYCLE GAS TURBINE, AND CO2 CAPTURE AND WATER ELECTROLYSIS UNITS

(71) Applicant: TotalEnergies OneTech, Courbevoie (FR)

(72) Inventors: Idar Ait Bengrir, Bellerive sur Allier (FR); Joe Hachem, Versailles (FR)

(73) Assignee: TotalEnergies OneTech, Courbevoie (FR)

( * ) Notice: Subject to any disclaimer, the term of this patent is extended or adjusted under 35 U.S.C. 154(b) by 0 days.

(21) Appl. No.: 18/996,138

(22) PCT Filed: Jul. 20, 2023

(86) PCT No.: PCT/EP2023/070196
§ 371 (c)(1),
(2) Date: Jan. 17, 2025

(87) PCT Pub. No.: WO2024/018020
PCT Pub. Date: Jan. 25, 2024

(65) Prior Publication Data
US 2026/0036069 A1 Feb. 5, 2026

(30) Foreign Application Priority Data
Jul. 20, 2022 (EP) .................................... 22306075

(51) Int. Cl.
*F01K 23/10* (2006.01)
*F22B 1/18* (2006.01)
*H02K 7/18* (2006.01)

(52) U.S. Cl.
CPC ............ *F01K 23/10* (2013.01); *F22B 1/1815* (2013.01); *H02K 7/1823* (2013.01)

(58) Field of Classification Search
CPC .......... F01K 23/10; F01K 23/106; F01K 7/22; F22B 1/1815; H02K 7/1823; H02K 7/18;
(Continued)

(56) References Cited

U.S. PATENT DOCUMENTS 11,433,350 B2 * 9/2022 Matake ................... F01K 23/10
11,512,402 B2 * 11/2022 Bairamijamal ......... C07C 41/01
(Continued)

FOREIGN PATENT DOCUMENTS

WO 2012/045373 A1 4/2012
WO 2021/205011 A1 10/2021

OTHER PUBLICATIONS

International Search Report issued in International Application No. PCT/EP2023/070196 dated Aug. 22, 2023.
(Continued)

*Primary Examiner* — Dapinder Singh
(74) *Attorney, Agent, or Firm* — Troutman Pepper Locke LLP

(57) ABSTRACT

An installation for producing electricity and/or mechanical power, comprising: a CCGT unit, a splitter for receiving and splitting flue gas into a first gas flow and a second gas flow, a CCS unit for receiving the first gas flow and storing CO2, a renewable electricity production unit, an electrolysis unit for producing an oxygen flow, a mixing unit for receiving the second gas flow and at least part of the oxygen flow, and for producing a working fluid of a gas turbine.

The installation is configured for switching between: a first operation mode, in which the renewable electricity production unit produces renewable electricity, and the electrolysis unit uses at least some of it, a second operation mode, in which the renewable electricity production unit is idle, and the electrolysis unit uses electricity from the CCGT unit or a local grid.

14 Claims, 2 Drawing Sheets

(58) Field of Classification Search
CPC ......... H02K 11/0094; F02C 6/14; F02C 6/16;
F02C 7/047; F02C 7/057; F02C 7/08;
F02C 7/143; Y02E 20/16; Y02E 20/14;
Y02E 10/20
See application file for complete search history.

(56) References Cited

U.S. PATENT DOCUMENTS

| | | | | |
|---|---|---|---|---|
| 11,549,432 | B2 * | 1/2023 | Hossain | F02C 3/28 |
| 11,578,653 | B2 * | 2/2023 | Migl | F02C 3/34 |
| 2017/0106332 | A1 * | 4/2017 | Hirata | B01D 53/346 |
| 2017/0114718 | A1 * | 4/2017 | Iijima | F02C 3/30 |
| 2021/0376413 | A1 * | 12/2021 | Asfha | F01D 15/10 |
| 2022/0062821 | A1 * | 3/2022 | Van der Walt | B01D 53/1425 |
| 2022/0065162 | A1 | 3/2022 | Hunt et al. | |

OTHER PUBLICATIONS

Extended European Search Report issued in European Patent Application No. 22306075.7 dated Jan. 5, 2023.

* cited by examiner

INSTALLATION FOR PRODUCING ELECTRICITY OR MECHANICAL POWER, COMPRISING A COMBINED CYCLE GAS TURBINE, AND CO2 CAPTURE AND WATER ELECTROLYSIS UNITS

CROSS REFERENCE TO RELATED APPLICATIONS

The present application is a U.S. National Phase Application under 35 U.S.C. § 371 of International Patent Application No. PCT/EP2023/070196 filed Jul. 20, 2023, which claims priority of European Patent Application No. 22306075.7 filed Jul. 20, 2022. The entire contents of which are hereby incorporated by reference.

FIELD OF THE INVENTION

The present invention deals with an installation for producing electricity and/or mechanical power, comprising:
- a combined cycle gas turbine unit having at least a gas turbine, a heat recovery steam generator, and a steam turbine, the gas turbine being adapted for receiving a fuel gas and a working fluid and for producing a first mechanical power and a flow of first flue gas, the heat recovery steam generator being adapted for receiving the flow of first flue gas and producing steam and a flow of second flue gas, and the steam turbine being adapted for receiving the steam and producing a second mechanical power,
- a carbon capture and storage unit adapted for receiving the first gas flow and storing CO2 contained in the flow of second flue gas.

The invention also deals with a corresponding process for producing electricity and/or mechanical power.

BACKGROUND

In a combined cycle gas turbine (or CCGT) both of the gas turbine and the steam turbine produce electricity or mechanical power. In the gas turbine, the working fluid is first compressed, then heated in the combustion chamber of the gas turbine where the fuel gas is burnt with the working fluid as oxidizer, and finally the combustion products are expanded in the turbine part, thus producing mechanical power which can be converted into electricity. The flow of first flue gas is used in the heat recovery boiler in order to produce steam, which can be expanded in the steam turbine in order to further produce mechanical power or electricity. The flow of second flue gas contains combustion products, mainly CO2, water, oxygen and nitrogen.

In order not to release CO2 in the atmosphere, a carbon capture and storage (or CCS) unit may be used. Its role is to capture CO2 from the flow of second flue gas and store the CO2 in such a way it does end in the atmosphere. Usually, the CO2 is injected in a subterranean reservoir.

However, such a way of capturing and storing CO2 requires a large unit, with huge investment costs, and consumes large amounts of energy, as the CO2 content in the flow of second flue gas is relatively low (usually 3% to 4%), compared with the CO2 content in the flue gas of coal fired plants (about 13% to 14%). Indeed, a larger absorber is needed.

Splitting the flow of second flue gas into a first gas flow sent to the CCS unit, and second gas flow recycled as part of the working fluid is a known way for reducing the amount of flue gas to be treated by the CCS unit.

However, recirculating a fraction of the flow of second flue gas increases the temperature of the working fluid and reduces its oxygen content, hence its ability to serve as an oxidizer. This limits the achievable recirculation rate and negatively impacts the costs and/or the energy output of the installation.

On another hand, using a renewable electricity production unit allows producing renewable (decarbonized) electricity, but in a discontinued way. For example solar and wind systems only produce electricity when enough light and wind are available. As a consequence, one cannot rely upon renewable electricity for reducing the size of the CCS unit or its energy consumption.

SUMMARY

An aim of the invention is to solve or improve the above issues, in particular to provide an installation for producing electricity and/or mechanical power heat comprising a combined cycle gas turbine unit, with no CO2 emissions and reduced costs.

To this end, the invention proposes an installation for producing electricity and/or mechanical power, comprising:
- a combined cycle gas turbine unit having at least a gas turbine, a heat recovery steam generator and a steam turbine the gas turbine being adapted for receiving a fuel gas and a working fluid and for producing a first mechanical power and a flow of first flue gas, the heat recovery steam generator being adapted for receiving the flow of first flue gas and producing steam and a flow of second flue gas, and the steam turbine being adapted for receiving the steam and producing a second mechanical power,
- a splitter adapted for receiving and splitting the flow of second flue gas into at least a first gas flow and a second gas flow, a rate of the second gas flow divided by a rate of the flow of second flue gas defining a flue gas recirculation rate of the combined cycle gas turbine unit,
- a carbon capture and storage unit adapted for receiving the first gas flow and storing CO2 contained in the first gas flow,
- a renewable electricity production unit adapted for producing renewable electricity,
- an electrolysis unit adapted for receiving water and the renewable electricity, and for producing a hydrogen flow and an oxygen flow, the electrolysis unit being electrically connected to the combined cycle gas turbine unit or intended to be electrically connected to a local grid, and
- a mixing unit adapted for receiving at least the second gas flow and at least part of the oxygen flow, and for producing the working fluid,
- the installation being configured for switching at least between:
- a first operation mode, in which the renewable electricity production unit produces the renewable electricity, and the electrolysis unit uses at least some of the renewable electricity (36) in order to produce the hydrogen flow and the oxygen flow, and
- a second operation mode, in which the renewable electricity production unit is idle, and the electrolysis unit uses electricity produced by the combined cycle gas turbine unit or taken from the local grid in order to produce the hydrogen flow and the oxygen flow.

In other embodiments, the installation comprises one or several of the following features, taken in isolation or any technically feasible combination:

the mixing unit is further adapted for receiving a flow of ambient air for producing the working fluid;

the installation further comprises a regulation system adapted for controlling the splitter and the mixing unit and wherein, in the first operation mode and the second operation mode, the working fluid comprises an oxygen content comprised between 15.5 vol. % and 16.5 vol. %;

the installation further comprises a fuel mixer adapted for mixing gaseous hydrocarbons and at least part of the hydrogen flow in order to obtain the fuel gas;

the gaseous hydrocarbons comprise natural gas or syngas;

the fuel gas comprises at least 85 vol. % of natural gas;

the installation further comprises a hydrogen storage system adapted for receiving at least part of the hydrogen flow and storing hydrogen intended to be injected into a network or conditioned in transportable tanks;

the installation further comprises a chiller adapted for receiving the working fluid, chilling the working fluid and releasing the chilled working fluid to the gas turbine;

the chiller is further adapted for producing condensed water from the working fluid, the electrolysis unit being further adapted for receiving said condensed water;

the installation further comprises a source of cooling water, the combined cycle gas turbine unit further comprising at least one condenser, the condenser and the chiller being adapted for receiving cooling water from the source of cooling water;

the carbon capture and storage unit is further adapted for receiving a flow of steam from the combined cycle gas turbine unit;

the heat recovery steam generator is further adapted for generating at least three flows of steam respectively at a high pressure level, a medium pressure level and a low pressure level; and the heat recovery steam generator is further adapted for reheating a flow of steam at the medium pressure level.

The invention also deals with a process for producing electricity and/or mechanical power comprising the following steps:

providing an installation as described above, using the fuel gas and the working fluid, producing, by the gas turbine, the first mechanical power and the flow of first flue gas, using the flow of first flue gas, producing, by the heat recovery steam generator, steam and the flow of second flue gas, using the steam, producing, by the steam turbine, a second mechanical power, splitting, by the splitter, the flow of second flue gas into at least the first gas flow and the second gas flow, storing, by the carbon capture and storage unit, CO2 contained in the first gas flow, producing, by the renewable electricity production unit, the renewable electricity, using water and the renewable electricity, producing, by the electrolysis unit, the hydrogen flow and the oxygen flow, mixing, by the mixing unit, at least the second gas flow and at least part of the oxygen flow, in order to produce the working fluid, switching the installation at least between the first and the second operational modes, in the first operation mode, producing, by the renewable electricity production unit, the renewable electricity, using at least some of the renewable electricity in the electrolysis unit in order to produce the hydrogen flow and the oxygen flow, and in the second operation mode, the renewable electricity production unit being idle, producing, by the electrolysis unit, the hydrogen flow and the oxygen flow using electricity produced by the combined cycle gas turbine unit or taken from a local grid.

BRIEF DESCRIPTION OF THE DRAWING

The invention and its advantages will be better understood upon reading the following description, given solely by way of example and with reference to the appended drawing, in which.

DETAILED DESCRIPTION

Figure 1:
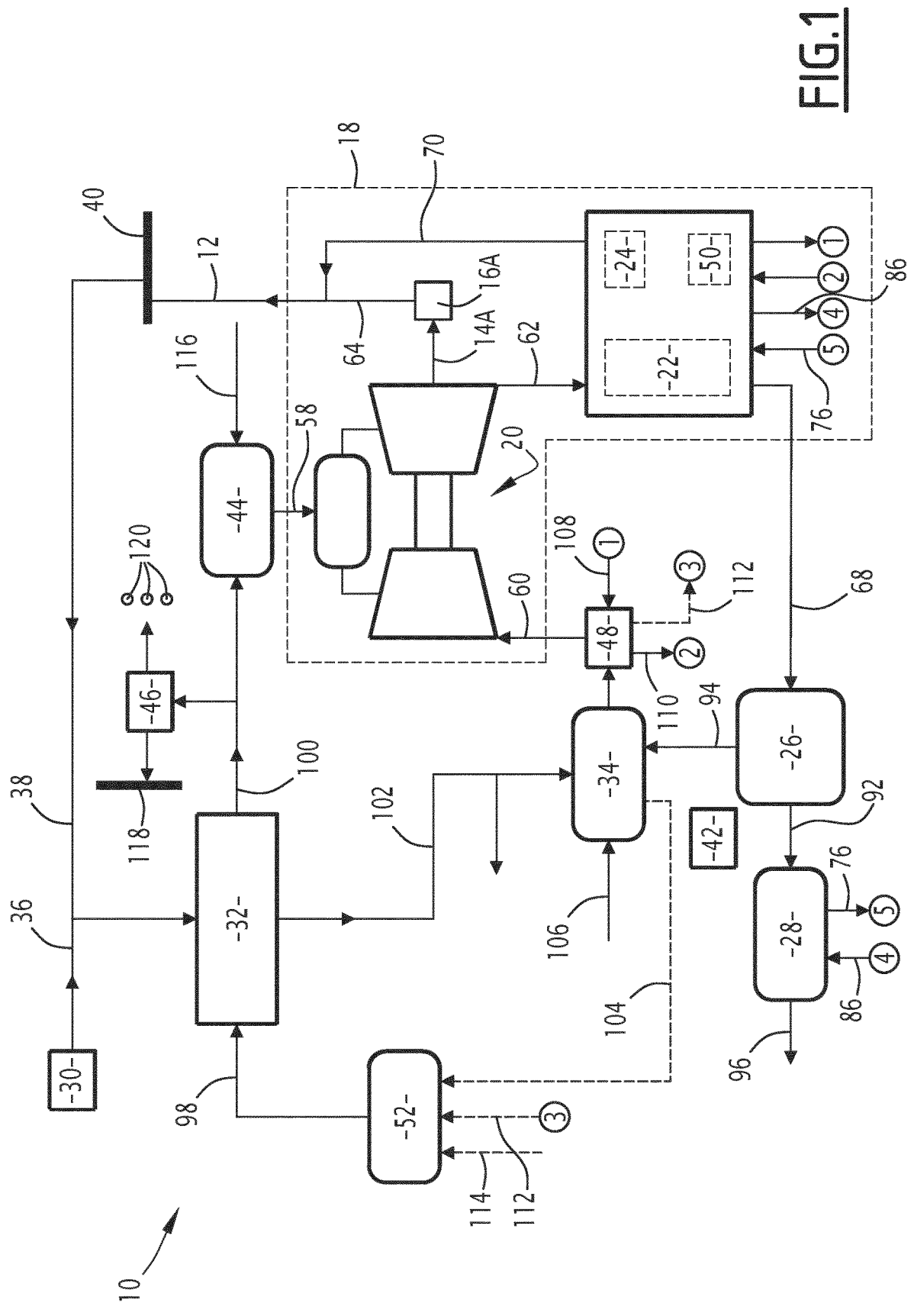
FIG. 1 is a schematic block diagram of an installation according to the invention.

An installation 10 according to the invention will now be described with reference to FIG. 1.

Figure 2:
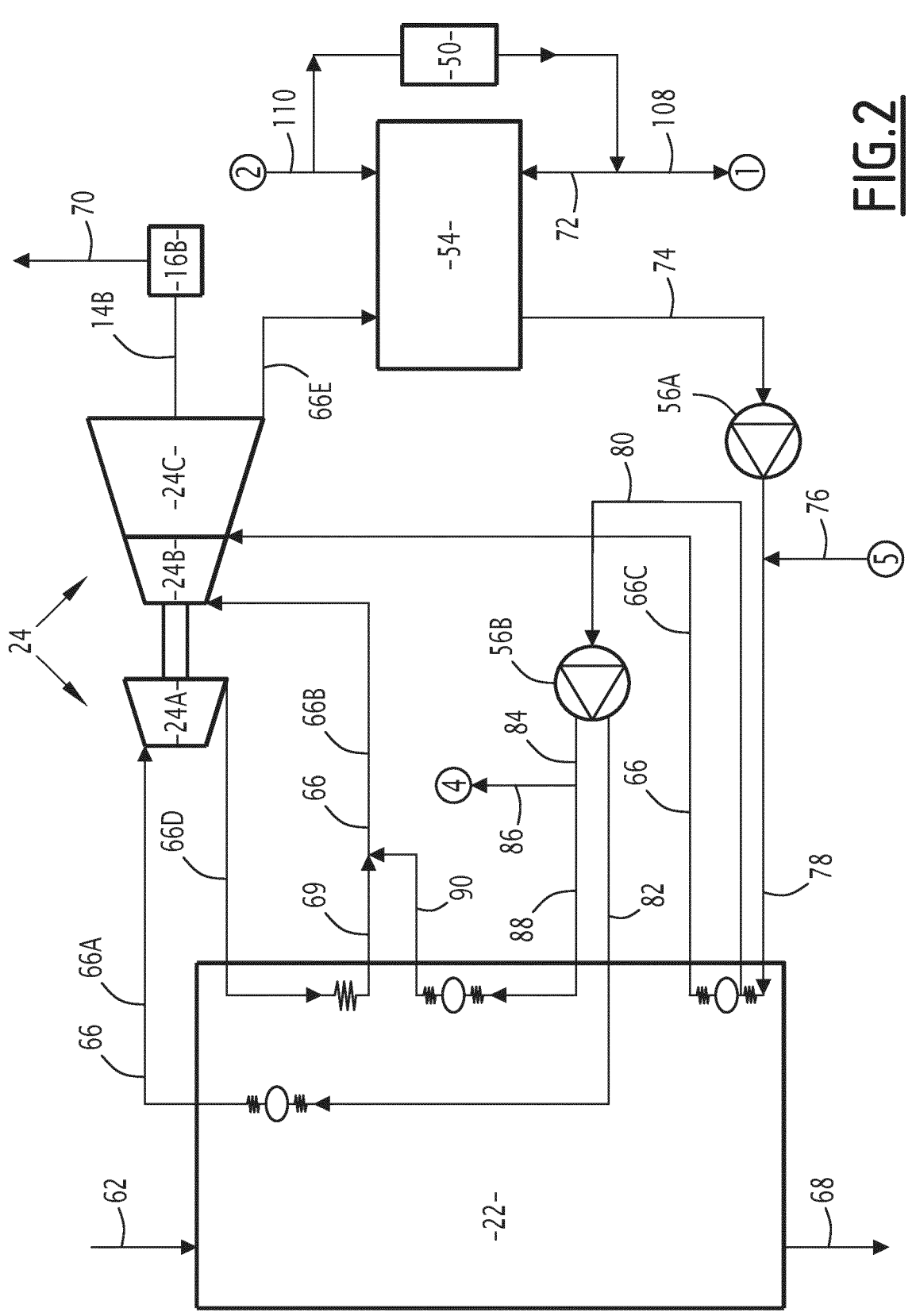
FIG. 2 is a schematic block diagram of another installation according to the invention.

The installation 10 is adapted for producing electricity 12. The installation is adapted for producing a first mechanical power 14A (FIG. 1) and a second mechanical power 14B (FIG. 2) which are, in the example, converted into the electricity 12 by two alternators 16A, 16B of the installation. In the example, the installation 10 does not produce steam other than for internal use.

The installation 10 comprises a combined cycle gas turbine unit 18 having at least a gas turbine 20, a heat recovery steam generator 22, and a steam turbine 24. The installation 10 comprises a splitter 26 and a carbon capture and storage unit 28. The installation 10 comprises a renewable electricity production unit 30, an electrolysis unit 32, and a mixing unit 34.

The installation 10 is configured for switching at least between a first operation mode, in which the renewable electricity production unit 30 produces renewable electricity 36, and the electrolysis unit 32 uses at least some of the renewable electricity, and a second operation mode, in which the renewable electricity production unit is idle, and the electrolysis unit 32 uses electricity 38 produced by the combined cycle gas turbine unit 18 or taken from a local grid 40.

Advantageously, the installation 10 further comprises a regulation system 42 adapted for controlling the splitter 26 and the mixing unit 34, a fuel mixer 44, and a hydrogen storage system 46.

For example, the installation 10 further comprises a chiller 48, a source of cooling water 50, and a water tank 52.

In the example, the combined cycle gas turbine unit 18 further comprises at least one condenser 54, and advantageously several pumps 56A, 56B.

The steam turbine 24 advantageously comprises a high pressure stage 24A, a medium pressure stage 24B, and a low pressure stage 24C.

The renewable electricity production unit 30 is for example a solar or a wind unit.

In the example, the electrolysis unit 32 is electrically connected to the combined cycle gas turbine unit 18 via the local grid 40.

The carbon capture and storage unit 28 is for example an amine-based carbon capture unit that strips the first gas flow 92 from carbon dioxide using an absorber/stripper couple (not shown) with the addition of heat coming from the heat recovery steam generator 22 (flow of steam 86). The CO2 96 is stored and the rest of the first gas flow 92 is sent to a stack (not shown).

The electrolysis unit 32 is for example a Polymer Electrolyte Membrane 'PEM' electrolysis that splits condensed water 112 from the chiller 48 or the mixing unit 34 or an external source (fresh water 114).

The operation of the installation 10 will now be described, which will provide an example of a process according to the invention.

The gas turbine 20 receives a fuel gas 58 and a working fluid 60, and produces the first mechanical power 14A and a flow of first flue gas 62. As already mentioned, the first mechanical power 14A is converted by the alternator 16A into electricity 64, which is part of the electricity 12 produced by the installation 10.

The heat recovery steam generator 22 receives the flow of first flue gas and produces steam 66 and a flow of second flue gas 68.

In the example, the heat recovery steam generator 22 generates three flows of steam 66A, 66B, 66C respectively at a high pressure level, a medium pressure level and a low pressure. The heat recovery steam generator 22 advantageously reheats a flow of steam 66D at medium pressure level coming from the high pressure stage 24A in order to form a reheated flow 69.

The steam turbine 24 receives the steam 66 and produces the second mechanical power 14B. As already mentioned, the second mechanical power 14B is converted by the alternator 16B into electricity 70, which is part of the electricity 12 produced by the installation 10.

In the example, the high pressure stage 24A receives the flow of steam 66A and produces the flow of steam 66D. The medium pressure stage 24B and the low pressure stage 24C respectively receive the flow of steam 66B and the flow of steam 66C and produce a residual flow 66E.

The condenser 54 receives the residual flow 66E, and cooling water 72 from the cooling water source 50. The residual flow 66E is condensed in a flow of water 74 which goes through the pump 56A. Then, in the example, the flow 74 is mixed to a flow of water 76 coming from the carbon capture and storage unit 28 in order to form a flow of feed water 78 for the heat recovery steam generator 22.

In the example, the flow of feed water 78 is heated in the heat recovery steam generator 22 in order to produce the flow of steam 66C and a flow 80 which goes to the pump 58B and then splits into a flow 82 which is heated in the heat recovery steam generator in order to form the flow of steam 66A, and into a flow 84.

The flow 84 is divided into a flow of steam 86 which is sent to the carbon capture and storage unit 28, and a flow 88 which is heated in the heat recovery steam generator 22 in order to form a flow 90.

The flow 90 and the reheated flow 69 are merged in order to form the flow of steam 66B.

The splitter 26 receives and splits the flow of second flue gas 68 into a first gas flow 92 and a second gas flow 94. The rate of the second gas flow 94 divided by the rate of the flow of second flue gas 68 defines a flue gas recirculation rate of the combined cycle gas turbine unit 18.

The carbon capture and storage unit 28 receives the first gas flow 92 and stores CO2 96 contained in the first gas flow. In the example, the carbon capture and storage unit 28 also receives the flow of steam 86 from the combined cycle gas turbine unit 18, and returns the flow of water 76. The flow of steam 86 brings energy to the carbon capture and storage unit 28 in order to absorb CO2 from the first gas flow 92.

In the first operation mode, the renewable electricity production unit 30 produces renewable electricity 36. The electrolysis unit 32 receives water 98 from the water tank 52, and the renewable electricity 36, and produces a hydrogen flow 100 and an oxygen flow 102.

In the second operation mode, the electrolysis unit 32 operates in the same way, except it uses the electricity 38 instead of the renewable electricity 36.

The installation switches from the first operation mode to the second operation mode when no sun or no wind is available, and vice-versa when sun or wind become available.

The mixing unit 34 receives the second gas flow 94 and at least part of the oxygen flow 102, and produces the working fluid 60. In the example, the mixing unit 34 produces condensed water 104 advantageously sent to the water tank 52. For example, the mixing unit 34 also receives a flow of ambient air 106 for producing the working fluid 60.

Advantageously, the working fluid 60 is received and chilled in the chiller 48, and then released to the gas turbine 20. For example, the chiller 48 receives cooling water 108 from the source of cooling water 50, and returns a flow of water 110 to the source of cooling water.

The chiller 48 for example produces condensed water 112 from the working fluid 60 and the electrolysis unit 32 receives said condensed water via the water tank 52.

Advantageously, in the first operation mode and the second operation mode, the working fluid 60 comprises an oxygen content comprised between 15.5 vol. % and 16.5 vol. %.

For example, the regulation system 42 controls the splitter 26 (flue gas recirculation rate) and the mixing unit 34 (rate of the oxygen flow 102 and the flow of ambient air 106, if any) in order to set the oxygen content in the working fluid 60 entering the gas turbine 20.

The water tank 52 advantageously receives the condensed water 104 and the condensed water 112, as well as fresh water 114.

The fuel mixer 44 mixes gaseous hydrocarbons 116, for example natural gas or syngas, and at least part of the hydrogen flow 100 in order to obtain the fuel gas 58.

In a particular embodiment, the fuel gas 58 comprises at least 85 vol. % of natural gas.

In another particular embodiment, the hydrogen storage system 46 may receive at least part of the hydrogen flow 100 and store hydrogen to be injected into a hydrogen network 118 or conditioned in transportable tanks 120.

Thanks to the above described features, the electricity 12 is produced without CO2 emissions and at reduced costs, as the carbon capture and storage unit 28 is much smaller as well as less energy consuming. Thanks to relatively pure oxygen being mixed with the second gas flow 94 in the mixing unit 34, the flue gas recirculation rate is increased and the first gas flow 92 sent to the carbon capture and storage unit 28 is decreased. Also due to a higher flue gas recirculation rate, the CO2 content in the first gas flow 92 is increased, which reduces the specific energy consumption of the carbon capture and storage unit 28. Besides, the hydrogen flow 100 produced by the electrolysis unit 32 provides part of the fuel gas burnt in the gas turbine 20, or may be valorized as a product. Advantageously, at least part of the electrolyzed water is recovered as condensed water 104 and 112.

In order to obtain the above advantages, an electrolysis unit is needed, which has a cost, both in terms of investment and electricity consumption. However, such an investment will decrease in the future, and the electricity consumption for the electrolysis is partly offset by the lower energy consumption of the carbon capture and storage unit. Hence the installation 10 remains cost effective. Moreover, the production flexibility of the combined cycle gas turbine unit 18 makes it possible to dampen the natural fluctuation in the renewable electricity production.

Example

The following table provides a comparison, obtained by simulation, of the installation 10 with a standard CCGT which has a CCS unit but does not have the renewable electricity production unit 30 and the electrolysis unit 32. Both installations produce 410 MW of electricity at the outlet of the alternators.

| | Standard CCGT | Installation 10 | Relative evolution (%) |
|---|---|---|---|
| Electricity 12 (MW) | 410 | 410 | |
| CCS unit 28 electricity input (MW) | 24.45 | 19.9 | −18.6 |
| CCS unit 28 heat input (MW) | 131.2 | 128 | −2.4 |
| CCS unit 28 estimated investment (M$) | 312.3 | 257.9 | −17.4 |
| Flue gas recirculation rate (%) | 0 | 39.7 | |
| CCS unit 28 input (first gas flow 92) (kg/s) | 717.6 | 435 | −39.4 |
| CO2 in the first gas flow 92 (mol. %) | 4.0 | 6.4 | +61.8 |
| Electrolysis unit 32 Power Consumption (MW) | 0 | 36.2 | |
| Hydrogen (from electrolysis) in the fuel gas 58 (vol. %) | 0 | 8.6 | |
| Renewable electricity 36 (MW) | 0 | 36.2 | |

The installation 10 allows reducing the price of the CCS unit by 17%. Indeed, the installation 10 allows reducing the rate of the first gas flow 92 (input of the CCS unit 28) by 39%, while increasing its CO2 content from 4.0% to 6.4%. The CCS unit 28 also consumes less steam and less electricity.

In the example, the oxygen content in the working fluid 60 is 16 mol. % for the installation 10.

The invention claimed is:

1. An installation for producing electricity or mechanical power, comprising:

a combined cycle gas turbine unit comprising at least a gas turbine, a heat recovery steam generator, and a steam turbine, the gas turbine being adapted for receiving a fuel gas and a working fluid and for producing a first mechanical power and a flow of first flue gas, the heat recovery steam generator being adapted for receiving the flow of first flue gas and producing steam and a flow of second flue gas, and the steam turbine being adapted for receiving the steam and producing a second mechanical power, a splitter adapted for receiving and splitting the flow of second flue gas into at least a first gas flow and a second gas flow, a rate of the second gas flow divided by a rate of the flow of second flue gas defining a flue gas recirculation rate of the combined cycle gas turbine unit, a carbon capture and storage unit adapted for receiving the first gas flow and storing CO2 contained in the first gas flow, a renewable electricity production unit adapted for producing renewable electricity, an electrolysis unit adapted for receiving water and the renewable electricity, and for producing a hydrogen flow and an oxygen flow, the electrolysis unit being electrically connected to the combined cycle gas turbine unit or intended to be electrically connected to a local grid, and a mixing unit adapted for receiving at least the second gas flow and at least part of the oxygen flow, and for producing the working fluid, the installation being configured for switching at least between:

a first operation mode, in which the renewable electricity production unit produces the renewable electricity, and the electrolysis unit uses at least some of the renewable electricity in order to produce the hydrogen flow and the oxygen flow, and a second operation mode, in which the renewable electricity production unit is idle, and the electrolysis unit uses electricity produced by the combined cycle gas turbine unit or taken from the local grid in order to produce the hydrogen flow and the oxygen flow.

2. The installation according to claim 1, wherein the mixing unit is further adapted for receiving a flow of ambient air for producing the working fluid.

3. The installation according to claim 1, further comprising a regulation system adapted for controlling the splitter and the mixing unit and wherein, in the first operation mode and the second operation mode, the working fluid comprises an oxygen content comprised between 15.5 vol. % and 16.5 vol. %.

4. The installation according to claim 1, further comprising a fuel mixer adapted for mixing gaseous hydrocarbons and at least part of the hydrogen flow in order to obtain the fuel gas.

5. The installation according to claim 4, wherein the gaseous hydrocarbons comprise natural gas or syngas.

6. The installation according to claim 1, wherein the fuel gas comprises at least 85 vol. % of natural gas.

7. The installation according to claim 1, further comprising a hydrogen storage system adapted for receiving at least part of the hydrogen flow and storing hydrogen intended to be injected into a network or conditioned in transportable tanks.

8. The installation according to claim 1, further comprising a chiller adapted for receiving the working fluid, chilling the working fluid and releasing the chilled working fluid to the gas turbine.

9. The installation according to claim 8, wherein the chiller is further adapted for producing condensed water from the working fluid, the electrolysis unit being further adapted for receiving said condensed water.

10. The installation according to claim 8, further comprising a source of cooling water, the combined cycle gas turbine unit further comprising at least one condenser, the condenser and the chiller being adapted for receiving cooling water from the source of cooling water.

11. The installation according to claim 1, wherein the carbon capture and storage unit is further adapted for receiving a flow of steam from the combined cycle gas turbine unit.

12. The installation according to claim 1, wherein the heat recovery steam generator is further adapted for generating at least three flows of steam respectively at a high pressure level, a medium pressure level and a low pressure level.

13. The installation according to claim 12, wherein the heat recovery steam generator is further adapted for reheating a flow of steam at the medium pressure level.

14. A process for producing electricity or mechanical power, comprising the following steps:

providing an installation according to claims 1, using the fuel gas and the working fluid, producing, by the gas turbine, the first mechanical power and the flow of first flue gas, using the flow of first flue gas, producing, by the heat recovery steam generator, steam and the flow of second flue gas, using the steam, producing, by the steam turbine, a second mechanical power, splitting, by the splitter, the flow of second flue gas into at least the first gas flow and the second gas flow, storing, by the carbon capture and storage unit, CO2 contained in the first gas flow, producing, by the renewable electricity production unit, the renewable electricity, using water and the renewable electricity, producing, by the electrolysis unit, the hydrogen flow and the oxygen flow, mixing, by the mixing unit, at least the second gas flow and at least part of the oxygen flow, in order to produce the working fluid, switching the installation at least between the first and the second operational modes, in the first operation mode, producing, by the renewable electricity production unit, the renewable electricity, using at least some of the renewable electricity in the electrolysis unit in order to produce the hydrogen flow and the oxygen flow, and in the second operation mode, the renewable electricity production unit being idle, producing, by the electrolysis unit, the hydrogen flow and the oxygen flow using electricity produced by the combined cycle gas turbine unit or taken from a local grid.

* * * * *